United States Patent
Li et al.

(10) Patent No.: US 9,679,151 B2
(45) Date of Patent: Jun. 13, 2017

(54) METHOD FOR ENCRYPTING ON-SCREEN CONTENTS, ELECTRONIC APPARATUS USING THE METHOD AND RECORDING MEDIUM USING THE METHOD

(71) Applicant: HTC Corporation, Taoyuan (TW)

(72) Inventors: Kuan-Wei Li, Taoyuan (TW); Chun-Hao Tseng, Taoyuan (TW)

(73) Assignee: HTC Corporation, Taoyuan (TW)

( * ) Notice: Subject to any disclaimer, the term of this patent is extended or adjusted under 35 U.S.C. 154(b) by 75 days.

(21) Appl. No.: 14/730,251

(22) Filed: Jun. 4, 2015

(65) Prior Publication Data

US 2016/0357975 A1    Dec. 8, 2016

(51) Int. Cl.
*G06F 21/00* (2013.01)
*G06F 21/62* (2013.01)

(52) U.S. Cl.
CPC .................................. *G06F 21/62* (2013.01)

(58) Field of Classification Search
USPC .......................................................... 726/26
See application file for complete search history.

(56) References Cited

U.S. PATENT DOCUMENTS

| | | | |
|---|---|---|---|
| 5,970,146 A | 10/1999 | McCall et al. | |
| 8,316,460 B1 * | 11/2012 | Wang | G06F 21/6209 713/165 |
| 9,251,383 B2 * | 2/2016 | Wang | G06F 21/83 |
| 2003/0140235 A1 * | 7/2003 | Immega | G06F 21/32 713/186 |
| 2007/0106789 A1 | 5/2007 | Blumenau | |
| 2008/0143890 A1 * | 6/2008 | Rosencwaig | G06F 3/147 348/836 |
| 2013/0254855 A1 * | 9/2013 | Walters | G06F 21/60 726/5 |
| 2014/0015987 A1 * | 1/2014 | Harple | G06F 3/005 348/207.1 |
| 2015/0007350 A1 * | 1/2015 | Gudipati | G06F 21/54 726/30 |
| 2015/0205993 A1 * | 7/2015 | Han | G06K 9/00013 345/173 |
| 2016/0357975 A1 * | 12/2016 | Li | G06F 21/62 |

FOREIGN PATENT DOCUMENTS

| | | |
|---|---|---|
| TW | 336301 | 7/1998 |
| TW | I480760 | 4/2015 |

\* cited by examiner

*Primary Examiner* — Harris C Wang
(74) *Attorney, Agent, or Firm* — Jianq Chyun IP Office

(57) ABSTRACT

A method for encrypting on-screen contents, an electronic apparatus using the method, and a recording medium using the method are provided. The method is adapted for the electronic apparatus having a screen. In the method, contents are displayed on the screen. A user's operation is then detected to generate a trigger signal. The displayed contents are encrypted according to the trigger signal.

14 Claims, 4 Drawing Sheets

METHOD FOR ENCRYPTING ON-SCREEN CONTENTS, ELECTRONIC APPARATUS USING THE METHOD AND RECORDING MEDIUM USING THE METHOD

BACKGROUND

To keep up with the bustling pace of modern human lives, a variety of mobile devices which are readily portable and compact have also flourished. Taking the smart phone, the personal digital assistant (PDA), the tablet PC, and the notebook computer for example, it not only is equipped with all the functions a traditional communication apparatus has, but also allows users to achieve purposes such as writing documents, receiving and sending electronic mails, surfing the Internet, or using instant messaging software through the built-in operating system or application programs.

When a user browses important information of files on his or her mobile phone, the user may need to store and encrypt the on-screen contents. Some mobile phone application programs corresponding to the files (e.g., photographs) in specific formats may be available for the user to encrypt the files through the menu. However, other on-screen contents (e.g., web-pages) not in the specific format may need to be converted into certain formats and can then be encrypted.

Besides, when the user takes some private pictures or photographs of confidential documents with the camera or the mobile phone capable of taking pictures or photographs, the user often performs some encryption functions before or after the photo-shooting action in order to prevent the pictures or photographs from being browsed, copied, or even stolen by others. These encryption functions, however, frequently require complicated manual operations before the photo-shooting action or specific settings after the photo-shooting action.

SUMMARY

The existing encryption actions require user's complicated operations, and the encryption function may need to be performed in advance or may require settings beforehand, which often causes inconvenience to the user; what is worse, some important information may not be successfully encrypted due to the complicated operations or the steps that must be carried out in advance. In view of the above, the disclosure is directed to a method for encrypting on-screen contents. The method is rather simple and can be applied to encrypt the on-screen contents in different manner of encryption.

In an example of the disclosure, a method for encrypting on-screen contents is provided, and the method is adapted for an electronic apparatus with a screen. In the method, a frame is displayed on the screen. A user's operation is then detected to generate a trigger signal. Contents displayed in the frame are encrypted according to the trigger signal.

According to an example of the disclosure, the step of encrypting the contents displayed in the frame according to the trigger signal includes identifying whether the frame includes the contents complying with a default format. If the frame includes the contents complying with the default format, the method further includes encrypting the contents complying with the default format; if the frame does not include the contents complying with the default format, the method further includes encrypting a screenshot of the frame.

According to an example of the disclosure, the step of detecting the user's operation to generate the trigger signal and the step of encrypting the contents displayed in the frame according to the trigger signal include detecting the user's operation with use of a first button arranged on the electronic apparatus to generate a first trigger signal, and capturing a biological characteristic with use of the first button. Here, the first button includes a biological characteristic sensor. The contents are then encrypted according to the captured biological characteristic.

According to an example of the disclosure, the step of detecting the user's operation to generate the trigger signal and the step of encrypting the contents displayed in the frame according to the trigger signal include detecting the user's operation with use of a first button arranged on the electronic apparatus to generate a first trigger signal, encrypting the contents displayed in the frame by applying a first method according to the first trigger signal, detecting the user's operation with use of a second button arranged on the electronic apparatus to generate a second trigger signal, and encrypting the contents displayed in the frame by applying a second method according to the second trigger signal or not encrypting the contents.

According to an example of the disclosure, the first button includes a biological characteristic sensor, and the step of detecting the user's operation with use of the first button arranged on the electronic apparatus to generate the first trigger signal and encrypting the contents displayed in the frame by applying the first method according to the first trigger signal further includes capturing a biological characteristic of the user with use of the first button and encrypting the contents according to the captured biological characteristic.

According to an example of the disclosure, the step of detecting the user's operation to generate the trigger signal and the step of encrypting the contents displayed in the frame according to the trigger signal include detecting the user's operation with use of a first shutter button arranged on the screen of the electronic apparatus to generate a first trigger signal, shooting a first photograph and encrypting the first photograph according to the first trigger signal, detecting the user's operation with use of a second shutter button arranged on the screen of the electronic apparatus to generate a second trigger signal, and shooting a second photograph but not encrypting the second photograph according to the second trigger signal.

According to an example of the disclosure, the step of detecting the user's operation to generate the trigger signal and the step of encrypting the contents displayed in the frame according to the trigger signal include detecting the user's operation with use of a first button arranged on the electronic apparatus to generate a first trigger signal, encrypting the contents displayed in the frame according to the first trigger signal, detecting the user's operation with use of a second button arranged on the electronic apparatus to generate a second trigger signal, and capturing a screenshot of the frame and encrypting the screenshot according to the second trigger signal.

In another example of the disclosure, an electronic apparatus that includes a screen, at least one button, and a processor is provided. The screen is configured to display a frame. The at least one button is configured to detect a user's operation to generate a trigger signal. The processor is coupled to the screen and the at least one button, and is configured to encrypt contents displayed in the frame according to the trigger signal generated by the at least one button.

According to an example of the disclosure, the processor identifies whether the frame includes the contents complying with a default format. If the frame includes the contents complying with the default format, the processor encrypts the contents complying with the default format; if the frame does not include the contents complying with the default format, the processor encrypts a screenshot of the frame.

According to an example of the disclosure, the default format includes an electronic mail, a message, text, a document, a photograph, an image, an audio file, or a video file.

According to an example of the disclosure, the at least one button includes a biological characteristic sensor capable of capturing a biological characteristic of the user and providing the captured biological characteristic to the processor for encrypting the contents according to the biological characteristic.

According to an example of the disclosure, the at least one button includes a first button and a second button. The first button is configured to detect the user's operation to generate a first trigger signal. The second button is configured to detect the user's operation to generate a second trigger signal.

According to an example of the disclosure, the processor further encrypts the contents displayed in the frame by applying a first method according to the first trigger signal and encrypting the contents displayed in the frame by applying a second method according to the second trigger signal or not encrypting the contents.

According to an example of the disclosure, the first button includes a biological characteristic sensor, and the processor captures a biological characteristic of the user with use of the first button and encrypts the contents according to the captured biological characteristic.

According to an example of the disclosure, the electronic apparatus is in a photo-shooting mode, and the at least one button includes a first shutter button and a second shutter button. The first shutter button is configured to detect the user's operation to generate a first trigger signal, and the processor shoots a first photograph and encrypts the first photograph according to the first trigger signal. The second shutter button is configured to detect the user's operation to generate a second trigger signal, and the processor shoots a second photograph according to the second trigger signal but does not encrypt the second photograph.

According to an example of the disclosure, the processor further encrypts the contents displayed in the frame according to the first trigger signal and captures and encrypts a screenshot of the fame.

In another example of the disclosure, a computer-readable recording medium configured for recording a program, loading the program via an electronic apparatus, and executing steps is provided. First, a frame is displayed on a screen of the electronic apparatus. A user's operation is detected to generate a trigger signal. Contents displayed in the frame are encrypted according to the trigger signal.

In view of the above, in the method for encrypting the on-screen contents according to the examples of the application, disposition of buttons of the electronic apparatus is conducive to the identification of user's encryption settings, or multiple buttons are configured in accordance with different encryption manners. Thereby, as long as the user intends to encrypt the on-screen contents, the user may do so in an intuitive and smart manner rather than dealing with the complicated settings.

In order to make the aforementioned and other features and advantages of the disclosure more comprehensible, several examples accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate examples of the disclosure and, together with the description, serve to explain the principles of the disclosure.

DESCRIPTION OF EXAMPLES

In the disclosure, the complicated encryption process is simplified into the operations with use of one single button or several buttons; by combining the mechanism of biological characteristic detection, different encryption manners may be offered to the user, such that the user is able to capture and encrypt the on-screen contents in an intuitive manner. Thereby, complicated operations are no longer required, and the user can easily perform the encryption process according to his or her needs so as to ensure the security of data.

Figure 1:
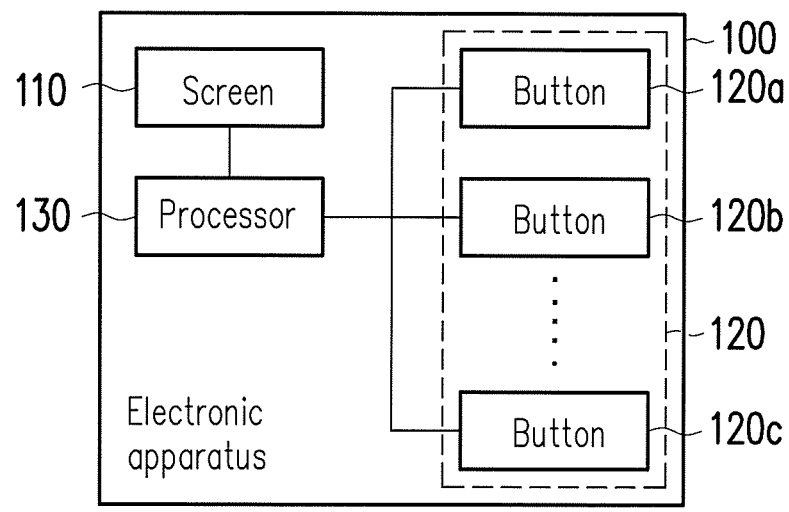
FIG. 1 is a block diagram of an electronic apparatus according to an example of the disclosure.

FIG. 1 is a block diagram of an electronic apparatus according to an example of the disclosure. With reference to FIG. 1, in the present example, the electronic apparatus 100 is a smart phone, a PDA phone, a tablet PC, a notebook computer, a digital camera, a digital camcorder, a digital recorder, or any other electronic apparatus, and the electronic apparatus 100 includes a screen 110, at least one button 120, and a processor 130. The functions of these components are described below.

The screen 110 may be a normal display, e.g., a liquid-crystal display (LCD), a plasma display, a vacuum fluorescent display, a light-emitting diode (LED) display, a field emission display (FED), and/or any other appropriate display. The screen 110 may also be a touch screen, e.g., a screen integrated by an LCD and a resistive, a capacitive, or any other type of touch sensing device. In the disclosure, any type of screen can be applied to display the on-screen contents of the electronic apparatus 100.

Buttons 120a, 120b, and 120c may be physical buttons arranged on the electronic apparatus 100 or virtual buttons displayed on the screen 110 of the electronic apparatus 100. Here, the buttons 120a, 120b, and 120c are configured to detect a user's operation to generate a trigger signal.

The processor 130 is, for instance, a central processing unit (CPU) or any other programmable general purpose or specific purpose microprocessor, digital signal processor (DSP), programmable controller, application specific integrated circuits (ASIC), programmable logic device (PLD), other similar devices, or a combination of these devices. The processor 130 is coupled to the screen 110 and the at least one button 120, and the processor 130 encrypts the on-screen contents according to the trigger signal generated by the at least one button 120. An example is exemplified hereinafter to describe the detailed steps of the method for encrypting the on-screen contents by the electronic apparatus 100.

Figure 2:
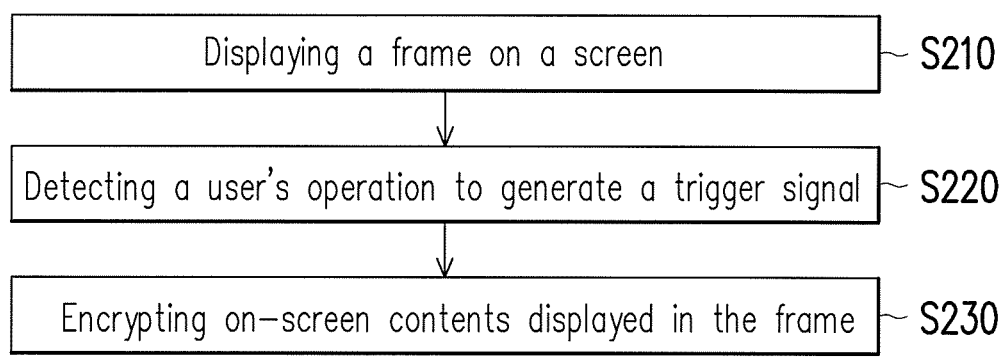
FIG. 2 is a flowchart illustrating a method for encrypting on-screen contents according to an example of the disclosure.

FIG. 2 is a flowchart illustrating a method for encrypting on-screen contents according to an example of the disclosure. The method shown in FIG. 2 and provided in the present example is suitable for the electronic apparatus 100 depicted in FIG. 1, and detailed steps of the method for encrypting the on-screen contents are described in detail below with reference to the aforesaid components of the electronic apparatus 100.

In step S210, the electronic apparatus 100 displays any frame on the screen 110. In step S220, the at least one button 120 detect a user's operation to generate a trigger signal. In step S230, the processor 130 encrypts contents displayed in the frame according to the trigger signal. Here, the number of the at least one button 120 can be one or more. In an example of the disclosure, different trigger signals are generated if the user touches different buttons 120, and the processor 130 determines the desired encryption manner or some or all of the on-screen contents to be encrypted according to the type of the received trigger signal, so as to properly encrypt the on-screen contents.

Specifically, in an example of the disclosure, as long as the user intends to encrypt the on-screen contents displayed on the screen 110, the user may press or touch at least one button 120 or one of the at least one button 120, so as to generate the trigger signal. According to an example of the disclosure, a fixed encryption manner and a constant encryption process are applied as long as the user presses the at least one button 120. According to another example, the processor 130 identifies whether the contents displayed on the screen 110 include a file complying with a default format. The default format may be an electronic mail, a message, text, a document, a photograph, an image, an audio file, a video file, and so on, which should not be construed as a limitation to the disclosure. In response to different default formats, the processor 130 may perform different manner of encryption and different processes of encryption. According to still another example, the processor may identify the function, the software, or the program which are currently being executed according to the trigger signal and perform different manner of encryption and different processes of encryption. Here, the function, the software, or the program being executed includes but is not limited to a browser, a document program, an image viewer, a video viewer, a camera, and so on.

The results of identification may be applied to determine the file format after encryption or determine how to perform the encryption process. If the on-screen contents comply with the default format, these contents can be encrypted and stored in a certain format. By contrast, if the on-screen contents do not comply with the default format, a screenshot of these contents can be captured and categorized into an image file, and then the on-screen contents can be encrypted and stored in form of an image.

Figures 3A, 3B, 3C:
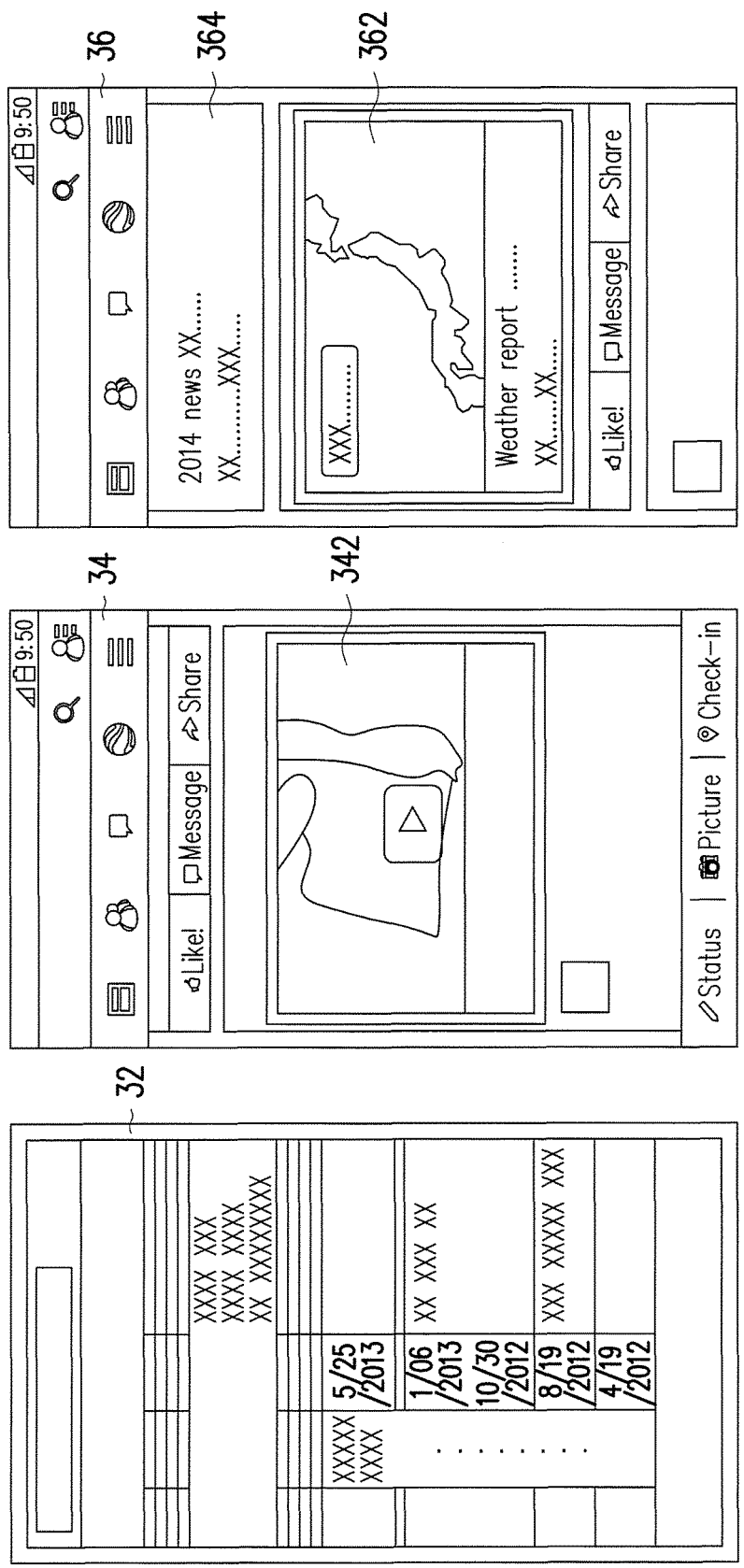
FIG. 3A to FIG. 3C are schematic views of encrypted on-screen contents according to an example of the disclosure.

FIG. 3A to FIG. 3C are schematic views of encrypted on-screen contents according to an example of the disclosure. With reference to FIG. 3A, when the screen 110 displays a frame 32 as shown in FIG. 3A, the processor 130 identifies the contents displayed in the frame 32, determines that the contents are texts, and encrypts and stores the frame 32 in a text format. Alternatively, if the processor 130 identifies the contents displayed in the frame 32 and determines that the contents are document viewing software, the processor 130 encrypts the document displayed in the frame 32. With reference to FIG. 3B, when the screen 110 displays a frame 34 as shown in FIG. 3B, the processor 130 identifies the contents displayed in the frame 34, determines that the contents include a video clip 342, and encrypts and stores the video clip 342 in a video format. Alternatively, if the processor 130 identifies the contents displayed in the frame 34 and determines that the contents are video viewing software, the processor 130 encrypts the video clip displayed in the frame 34 or the link of the video clip. With reference to FIG. 3C, when the screen 110 displays a frame 36 shown in FIG. 3C, the processor 130 cannot determine the file format of the contents in the frame 36 because the frame 36 contains both a web-page 362 and texts 364, and thus the processor 130 captures the screenshot of the on-screen contents and encrypts and stores the screenshot in an image format. Alternatively, if the processor 130 identifies the frame 36 as a web-page or identifies the currently executed program as a browsing program, the processor 130 encrypts the address of the web-page in the frame 36 by storing the address of the web-page in a specific and encrypted folder, e.g., the "my favorite" folder that is being encrypted by the user.

Besides, if the processor 130 is unable to determine the file format of the on-screen contents on the screen 110, the processor 130 may, in another example of the disclosure, allow the user to store the contents after the user selects the file format (e.g., an electronic mail, a message, text, a document, a photograph, an image, an audio file, or a video file) through a menu. People skilled in the pertinent art should understand that the above examples are merely exemplary and should not be construed as limitations to the disclosure.

From another perspective, in the previous examples, the manner of encryption can be determined by the user. For instance, the user may be required to input a password and perform the encryption process after inputting the correct password. In case of decryption, the password can be input again. It is also likely for the user to save the to-be-encrypted frame into a specific folder which can only be accessed after inputting a certain password, a specific gesture, or a specific pattern, for instance. People skilled in the pertinent art should understand that the manner of encryption provided herein is merely exemplary and should not be construed as a limitation to the disclosure.

Besides, in an example of the disclosure, an identity of the user can be identified so as to perform the encryption manner pre-determined by the user. In the disclosure, a biological characteristic sensor (e.g., including but not limited to a fingerprint sensor) may be further arranged in the button 120 of the electronic apparatus 100. Since the biological characteristics are unique and cannot be copied, different users can be identified by using biometrics, and the encryption manner set by the identified user is then performed. Here, the button 120 can be a physical button or a virtual button displayed on a touch screen capable of performing biometrics authentication. In most cases, the biological characteristics of the user must be registered or stored in advance for authentication. After the biological characteristics of the user are registered or stored, as long as the button equipped with the biological characteristic sensor senses the biological characteristics of the user, the sensed biological characteristics can be compared with the registered or stored biological characteristics to find out if these biological characteristics are matched.

If any user intends to encrypt the on-screen contents displayed on the screen 110, as long as the user presses or touches the button 120 equipped with the biological characteristic sensor, the button generates the trigger signal and senses the biological characteristics of the user and compares the same with the registered biological characteristics. If the sensed biological characteristics are matched with the registered ones, the on-screen contents can be encrypted in the manner predetermined by the user whose biological characteristics are matched with the registered biological characteristics. If the sensed biological characteristics are not matched with the registered ones, the on-screen contents may be encrypted or may not be encrypted or no action is performed according to a default setting.

It should be mentioned that the biological characteristics may be applied to identify different users, so as to determine the corresponding encryption manner. For instance, the to-be-encrypted on-screen contents are stored in a folder corresponding to a specific user, the on-screen contents are encrypted by a certain password, or the to-be-encrypted on-screen contents are encrypted and stored in a specific file format. Said biological characteristics can be configured for direct encryption, i.e., the biological characteristics may serve as the password of encrypting the on-screen contents. People skilled in the pertinent art should understand that the applications of the biological characteristics provided herein are merely exemplary and should not be construed as imitations to the disclosure.

Figure 4:
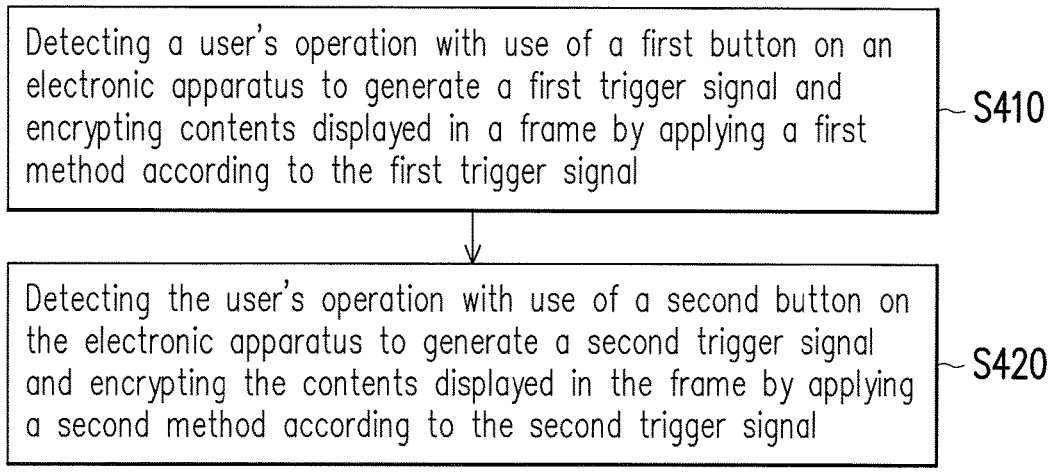
FIG. 4 is a flowchart illustrating a method for encrypting on-screen contents according to an example of the disclosure.

In another example of the disclosure, the electronic apparatus 100 may have at least two buttons in accordance with different encryption manners. FIG. 4 is a flowchart illustrating a method for encrypting on-screen contents according to an example of the disclosure. The method shown in FIG. 4 and provided in the present example is suitable for the electronic apparatus 100 depicted in FIG. 1, and detailed steps of the method for encrypting the on-screen contents are described in detail below with reference to the aforesaid devices of the electronic apparatus 100.

In step S410, the electronic apparatus 100 detects the user's operation with use of a first button 120a to generate a first trigger signal, and the processor 130 encrypts the contents displayed in the frame by applying a first method according to the first trigger signal. In step S420, the electronic apparatus 100 detects the user's operation with use of a second button 120b to generate a second trigger signal, and the processor 130 encrypts the contents displayed in the frame by applying a second method according to the second trigger signal. Since the details of detecting the user's operation and encrypting the contents in steps S410 and S420 are identical or similar to steps S220 and S230 provided in the previous examples, these details will not be further explained hereinafter.

The differences between these examples lie in that the two buttons arranged in the electronic apparatus according to the present example correspond to different encryption manners, and at least one of the two buttons is able to perform the encryption function. For instance, in an example of the disclosure, one button may be equipped with the biological characteristic sensor, while the other corresponds to an encryption function. Hence, once the user touches or presses the button equipped with the biological characteristic sensor, the corresponding encryption manner can be determined according to the sensed biological characteristics. Namely, the identification of the user is identified by the sensed biological characteristics, so as to determine the encryption manner corresponding to the identified user. In another aspect, once the user touches the other button, the on-screen contents are directly encrypted through the encryption manner corresponding to the button. According to another example, one of the buttons may correspond to the encryption function and may be equipped with the biological characteristic sensor for capturing the biological characteristics of the user to determine the corresponding encryption manner. The other button is merely configured to capture the on-screen contents and is not applied to perform the encryption function. People skilled in the pertinent art should understand that the buttons and the corresponding manner of encryption provided herein are merely exemplary and should not be construed as imitations to the disclosure.

In still another example of the disclosure, when the electronic apparatus 100 executes a specific application program, the electronic apparatus 100 can encrypt the on-screen contents in the same manner as described above while the specific application program is being executed. For instance, if the user activates a photo-shooting function of the electronic apparatus 100, the photographs taken by the electronic apparatus 100 can be encrypted while the electronic apparatus 100 is in the photo-shooting mode.

Figure 5:
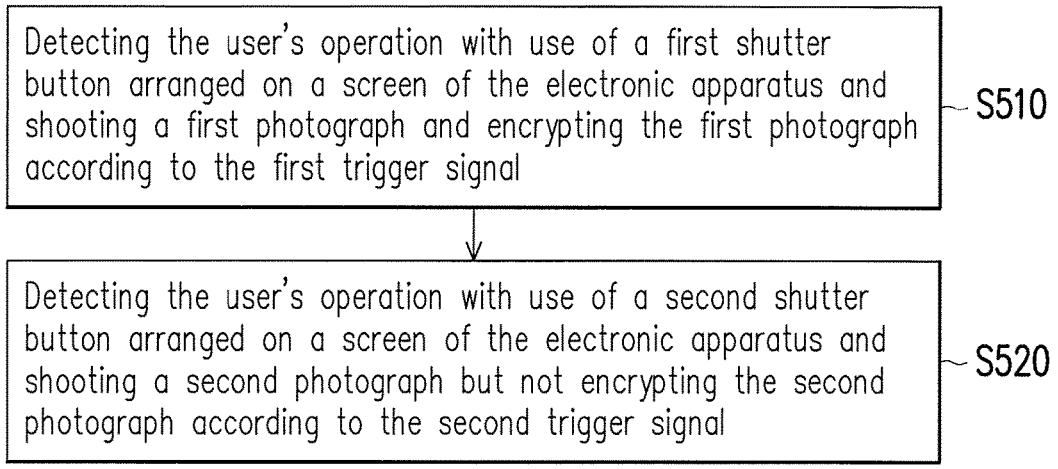
FIG. 5 is a flowchart illustrating a method for encrypting on-screen contents in a photo-shooting mode according to an example of the disclosure.

FIG. 5 is a flowchart illustrating a method for encrypting on-screen contents in a photo-shooting mode according to an example of the disclosure. The method shown in FIG. 5 and provided in the present example is suitable for the electronic apparatus 100 depicted in FIG. 1, and detailed steps of the method for encrypting the on-screen contents are described in detail below with reference to the aforesaid devices of the electronic apparatus 100.

In step S510, a first shutter button 120a arranged on the screen 110 of the electronic apparatus 100 is configured to detect the user's operation to generate a first trigger signal, and the processor 130 shoots a first photograph and encrypts the first photograph according to the first trigger signal. In step S520, a second shutter button 120b arranged on the screen 110 of the electronic apparatus 100 is configured to detect the user's operation to generate a second trigger signal, and the processor 130 shoots a second photograph according to the second trigger signal but does not encrypt the second photograph. Since the details, of detecting the user's operation and encrypting the contents in steps S510 and S520 are identical or similar to steps S410 and S420 provided in the previous examples, these details will not be further explained hereinafter.

The differences between these examples lie in that the two buttons arranged in the electronic apparatus in the photo-shooting mode correspond to different encryption manners according to the present example. Here, the first shutter button 120a is used to take photographs and encrypt the on-screen contents, and the second shutter button 120b can only be used to take photographs. The first and second shutter buttons 120a and 120b may be physical buttons arranged on the electronic apparatus 100 or virtual buttons displayed on the screen 110 of the electronic apparatus 100, which should however not be construed as limitations to the application. Thereby, the user may select and press the first shutter button 120a or the second shutter button 120b based on his or her needs, and the electronic apparatus 100 then performs the corresponding encryption manner on the photographs, which simplifies the process of encrypting the photographs taken by the user.

Said manner of description provided in different examples of the disclosure is applicable to encrypt videos that are recorded. For instance, in an example of the disclosure, the first shutter button is used to record videos and encrypt the video contents, while the second shutter button is merely used to record videos. Thereby, the user may select and press the first shutter button or the second shutter button based on his or her needs, and the electronic apparatus 100 then performs the corresponding encryption manner on the videos, which simplifies the process of encrypting the videos recorded by the user.

Said manner of encrypting videos can also be applied for broadcasting live videos. For instance, in an example of the disclosure, if the user presses the first button, the live video is encrypted, while the live video is not encrypted if the user presses the second button. The encryption of the broadcast live video allows specific users to watch the encrypted live videos, and the specific users may be those who also share the live videos through certain websites or who are registered to the broadcast service or to the same group.

Certainly, said manner of description provided in different examples of the disclosure is applicable to encrypt audio clips that are recorded. For instance, in an example of the disclosure, the first button is used to record audio clips and encrypt the recorded contents, while the second shutter button is merely used to record audio clips. Thereby, the user may select and press the first button or the second button based on his or her needs, and the electronic apparatus 100 then performs the corresponding encryption manner on the audio clips, which simplifies the process of encrypting the recorded contents.

Figure 6:
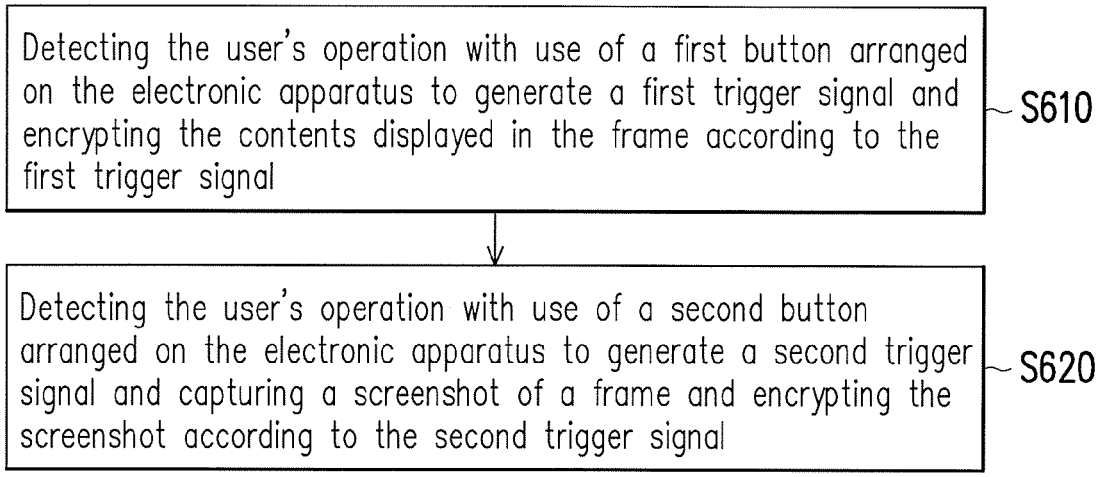
FIG. 6 is a flowchart illustrating a method for encrypting on-screen contents according to an example of the disclosure.

In still another example of the disclosure, the electronic apparatus 100 may be equipped with two buttons which may be applied to encrypt some contents displayed in the frame and to encrypt a screenshot of the entire frame, respectively. FIG. 6 is a flowchart illustrating a method for encrypting on-screen contents according to an example of the disclosure. The method shown in FIG. 6 and provided in the present example is suitable for the electronic apparatus 100 depicted in FIG. 1, and detailed steps of the method for encrypting the on-screen contents are described in detail below with reference to the aforesaid devices of the electronic apparatus 100.

In step S610, the electronic apparatus 100 detects the user's operation with use of a first button 120a arranged on the electronic apparatus 100 to generate a first trigger signal, and the processor 130 encrypts the contents displayed in the frame according to the first trigger signal. In step S620, the electronic apparatus 100 detects the user's operation with use of a second button 120b arranged on the electronic apparatus 100 to generate a second trigger signal, and the processor 130 captures the screenshot of the frame and encrypts the screenshot according to the second trigger signal. Since the details of detecting the user's operation and encrypting the contents in steps S610 and S620 are identical or similar to steps S410 and S420 provided in the previous examples, these details will not be further explained hereinafter.

The difference between the present example and the previous example lies in that the two buttons arranged in the electronic apparatus 100 respectively correspond to some contents displayed on the screen and the screenshot of the entire frame on the screen according to the present example. As long as the user observes the on-screen contents including an electronic mail, a message, text, a document, a photograph, an image, an audio file, a video file, or any other file in a known format, the user may directly press the first button 120a to generate the first trigger signal, and the processor 130 identifies the file complying with the known format from the on-screen contents and encrypts the identified file. On the other hand, if the user intends to store the entire frame rather than the individual files, the user may press the second button 120b to generate the second trigger signal, and the processor 130 directly captures the screenshot of the frame and encrypts the captured screenshot.

The application is further directed to a non-volatile computer-readable recording medium that records a computer program configured to execute each step in the method for encrypting the on-screen contents provided above. The computer program is basically composed by a plurality of program code snippets (e.g., a building organization chart program code snippet, a document approving program code snippet, a setting program code snippet, and a deploying program code snippet). After the program code snippets are loaded into the electronic device and executed by the same, the steps of the method for encrypting the on-screen contents are completed.

People having ordinary skill in the art should understand that the buttons described in the previous examples, the number of the buttons, the application programs, and the file formats are merely exemplary and should not be construed as limitations to the examples of the disclosure. That is, the type of buttons is not limited to the physical buttons, the virtual buttons, and the biological characteristic sensors on the buttons as provided in the previous examples. In addition, the type of file formats is not limited to the electronic mail, the message, the text, the document, the photograph, the image, the audio file, the video file, and so on.

To sum up, according to the method for encrypting the on-screen contents provided in the examples of the disclosure, the encryption manner (e.g., normal encryption or biometrics authentication) or the contents to be encrypted (some of the contents or the screenshot of the frame) may be distinguished by the button settings of the electronic apparatus. Thereby, as long as the user intends to encrypt the contents, the user is merely required to select and press or touch the corresponding button rather than dealing with the complicated settings.

It will be apparent to those skilled in the art that various modifications and variations can be made to the structure of the disclosed examples without departing from the scope or spirit of the disclosure. In view of the foregoing, it is intended that the disclosure cover modifications and variations of this disclosure provided they fall within the scope of the following claims and their equivalents.

What is claimed is:

1. A method for encrypting on-screen contents, adapted for an electronic apparatus having a screen, comprising:
    displaying a frame on the screen;
    detecting a user's operation to generate a trigger signal; and
    encrypting contents displayed in the frame according to the trigger signal, wherein the step of encrypting comprises:
        identifying whether the frame comprises the contents complying with a default format;
        if the frame comprises the contents complying with the default format, encrypting the contents complying with the default format; and
        if the frame does not comprise the contents complying with the default format, encrypting a screenshot of the frame,
    wherein the default format comprises an electronic mail, a message, text, a document, a photograph, an image, an audio file, or a video file.

2. The method of claim 1, wherein the step of encrypting the contents displayed in the frame according to the trigger signal comprises:
    identifying whether an executed application program is a specific application program;

if the executed application program is the specific application program, encrypting the contents according to the specific application program.

3. The method of claim 1, wherein the step of detecting the user's operation to generate the trigger signal and the step of encrypting the contents displayed in the frame according to the trigger signal comprise:
   detecting the user's operation with use of a first button arranged on the electronic apparatus to generate a first trigger signal, and capturing a biological characteristic with use of the first button, wherein the first button comprises a biological characteristic sensor; and
   encrypting the contents displayed in the frame according to the biological characteristic.

4. The method of claim 1, wherein the step of detecting the user's operation to generate the trigger signal and the step of encrypting the contents displayed in the frame according to the trigger signal comprise:
   detecting the user's operation with use of a first button arranged on the electronic apparatus to generate a first trigger signal and encrypting the contents displayed in the frame by applying a first method according to the first trigger signal; and
   detecting the user's operation with use of a second button arranged on the electronic apparatus to generate a second trigger signal and encrypting the contents displayed in the frame by applying a second method according to the second trigger signal or not encrypting the contents.

5. The method of claim 4, wherein the first button comprises a biological characteristic sensor, and the step of detecting the user's operation with use of the first button arranged on the electronic apparatus to generate the first trigger signal and encrypting the contents displayed in the frame by applying the first method according to the first trigger signal further comprises:
   capturing a biological characteristic of the user with use of the first button; and
   encrypting the contents according to the captured biological characteristic.

6. The method of claim 1, wherein the electronic apparatus is in a photo-shooting mode, and the step of detecting the user's operation to generate the trigger signal and the step of encrypting the contents displayed in the frame according to the trigger signal comprise:
   detecting the user's operation with use of a first shutter button arranged on the screen of the electronic apparatus to generate a first trigger signal and shooting a first photograph and encrypting the first photograph according to the first trigger signal; and
   detecting the user's operation with use of a second shutter button arranged on the screen of the electronic apparatus to generate a second trigger signal and shooting a second photograph but not encrypting the second photograph according to the second trigger signal.

7. An electronic apparatus, comprising:
   a screen, configured to display a frame;
   at least one button, configured to detect a user's operation to generate a trigger signal; and
   a processor, coupled to the screen and the at least one button, and configured to encrypt contents displayed in the frame according to the trigger signal generated by the at least one button, identify whether the frame comprises the contents complying with a default format, encrypt the contents complying with the default format if the frame comprises the contents complying with the default format, and encrypt a screenshot of the frame if the frame does not comprise the contents complying with the default format,
   wherein the default format comprises an electronic mail, a message, text, a document, a photograph, an image, an audio file, or a video file.

8. The electronic apparatus of claim 7, wherein the at least one button comprises:
   a biological characteristic sensor, configured to capture a biological characteristic of the user and provide the captured biological characteristic to the processor for encrypting the contents according to the biological characteristic.

9. The electronic apparatus of claim 7, wherein the processor further identifies an executed application program, and if the executed application program is a specific application program, the processor encrypts the contents according to the specific application program.

10. The electronic apparatus of claim 7, wherein the at least one button comprises:
    a first button, configured to detect the user's operation to generate a first trigger signal; and
    a second button, configured to detect the user's operation to generate a second trigger signal.

11. The electronic apparatus of claim 10, wherein the processor further encrypts the contents displayed in the frame by applying a first method according to the first trigger signal and encrypting the contents displayed in the frame by applying a second method according to the second trigger signal or not encrypting the contents.

12. The electronic apparatus of claim 11, wherein the first button comprises a biological characteristic sensor, and the processor captures a biological characteristic of the user with use of the first button, so as to encrypt the contents according to the captured biological characteristic.

13. The electronic apparatus of claim 7, wherein the electronic apparatus is in a photo-shooting mode, and the at least one button comprises:
    a first shutter button, configured to detect the user's operation to generate a first trigger signal, wherein the processor shoots a first photograph and encrypts the first photograph according to the first trigger signal; and
    a second shutter button, configured to detect the user's operation to generate a second trigger signal, wherein the processor shoots a second photograph according to the second trigger signal but does not encrypt the second photograph.

14. A non-transitory computer-readable recording medium, recording a program to be loaded into an electronic apparatus for executing steps of:
    displaying a frame on a screen of the electronic apparatus;
    detecting a user's operation to generate a trigger signal;
    encrypting contents displayed in the frame according to the trigger signal;
    identifying whether the frame comprises the contents complying with a default format;
    encrypting the contents complying with the default format if the frame comprises the contents complying with the default format;
    encrypting a screenshot of the frame if the frame does not comprise the contents complying with the default format,
    wherein the default format comprises an electronic mail, a message, text, a document, a photograph, an image, an audio file, or a video file.

* * * * *